US006532822B1

(12) United States Patent
Boyd

(10) Patent No.: US 6,532,822 B1
(45) Date of Patent: Mar. 18, 2003

(54) RESONANT TORSION PENDULUM PRESSURE SENSOR

(76) Inventor: Clark Davis Boyd, 3 Wells Ct., Hampton, VA (US) 23666

( * ) Notice: Subject to any disclaimer, the term of this patent is extended or adjusted under 35 U.S.C. 154(b) by 139 days.

(21) Appl. No.: 09/669,136

(22) Filed: Sep. 26, 2000

(51) Int. Cl.[7] .............................................. G01L 11/00
(52) U.S. Cl. ............................ 73/702; 73/728; 73/722; 73/778
(58) Field of Search .......................... 73/704, 702, 756, 73/778, 754, 724, 706, 722, 728

(56) References Cited

U.S. PATENT DOCUMENTS 4,600,855 A * 7/1986 Strachan ..................... 310/338
5,317,917 A * 6/1994 Dufour ......................... 73/702

* cited by examiner

Primary Examiner—Hezron Williams
Assistant Examiner—Jermaine Jenkins
(74) Attorney, Agent, or Firm—David J. Bolduc

(57) ABSTRACT

A pressure responsive mechanically resonant sensor device is provided that comprises a torsion pendulum driven at resonance. The pressure sensor includes a rigid frame to which is affixed a torsion pendulum comprising a hollow tube and a resonant mass as well as optimal means for applying energy to drive the torsion pendulum at resonance. The interior of the hollow tube portion of the torsion pendulum communicates through a pressure port in the rigid frame with the fluid whose pressure is to be sensed. The input pressure affects the torsion constant of the hollow tube and therefor changes the resonant frequency of the torsion pendulum, which frequency is converted into an indication of the sensed pressure.

19 Claims, 7 Drawing Sheets

RESONANT TORSION PENDULUM PRESSURE SENSOR

BACKGROUND OF INVENTION

1. Field of Invention

The present invention relates generally to gas pressure sensors. More particularly, the present invention relates to a gas or fluid pressure sensing device operating in a resonant mode, and particularly adapted for sensing a wide range of pressures with a high degree of accuracy and repeatability. The resonant motion of the pressure sensor is at right angles to the effect of fluid pressure within the sensor and thus has a high degree of accuracy independent of the type of fluid.

2. Description of Prior Art

The need for accurate, low cost, compact pressure sensors having a broad range of measurement is becoming widely appreciated. Measurement of broad ranges of pressures in systems is particularly challenging because of the enormous range of pressures that can be realized. Many systems have two or more types of gauges, each with its particular range of usefulness. The need to switch between different gauges is tiresome and produces reading discontinuities where the gauge ranges meet. Gauges that are capable of accurate measurement in a broad pressure range are attractive because they can reduce the number of different types of gauges needed to monitor a particular vacuum system.

In an attempt to satisfy this need, a number of devices have been proposed. One type of gauge known to those familiar with vacuum techniques as the Langmuir gauge utilizes the molecular drag effect. These devices use the fact that the presence of air or other gases surrounding a mechanical vibrator exerts a damping effect upon the vibration. As the pressure of the surrounding gas is diminished, the damping effect is reduced. In this type of gauge, a fine quartz fiber anchored at one end and the other end is free to vibrate. Vibration is excited by striking the fiber (internally) and the time for the free vibrations to decay to half amplitude is monitored. Essentially, the decay time is as an indicator of vacuum. As the gas pressure is reduced, the decay time of the vibrator increases.

In the Langmuir gauge, measuring the time for the oscillations to decay (e.g. to one half amplitude) after the driving oscillator has stopped is used to determine the pressure. A second method is a measurement of the bandwidth of the vibrator by driving it with a variable frequency oscillator and tuning over the frequency band of the vibrator. Neither of these two methods lends itself to a simple direct measurement suitable for a commercial gas pressure gauge.

Another class of gauges making use of the molecular drag phenomenon uses a freely swinging fiber or vane as a means of measuring pressures in the range of $10^{-3}$ Torr to $10^{-5}$ Torr. The fiber or vane pendulum is started swinging mechanically and time for the pendulum to damp to one half its original amplitude, or half-life, is measured. This method of measuring pressure, however, is quite limited in range. It is also cumbersome and takes on the order of one hour to make a measurement at low pressure.

Another type of pressure gauge that makes use of the drag forces of a gas is called a spinning rotor gauge. This gauge measures the deceleration of a magnetically levitated spinning metal sphere inside a stainless steel chamber that its, in turn, immersed in the gas that is to have its pressure measured. The ball is electromagnetically spun up to a target rotation rate and then allowed to decelerate. The rate of the ball's deceleration-is proportional to the number of gas molecules that come in contact with the ball per unit time which is, in turn, proportional to gas pressure. This gauge can measure pressures in the range of $10^{-2}$ Torr to $5 \times 10^{-7}$ Torr. Spinning ball gauges are very accurate, however their use, is restricted by their size, high cost and limited range of measurement capability.

Another type of resonant gauge uses tuning fork quartz crystal oscillators to measure gas friction. In this gas pressure sensor, a tuning fork quartz is exposed to the measuring environment and the resistance of the tuning fork quartz at resonant frequency is measured. By means of a phase-coupled, electric oscillation system (PLL circuit) and an evaluation circuit, the change of resistance of the tuning fork is measured and appropriately indicated.

Another type of gauge employing this principle uses a tuning fork made from piezoelectric material as the sensing element. The tuning fork is made to oscillate and its resonance resistance, which is directly proportional to gas pressure when the pressure is low enough to be in the molecular flow region, is measured. When the pressure rises to a level where the flow begins to become viscous, the resonance resistance continues to increase with pressure, but at a much reduced rate. To make a pressure measurement using the tuning fork oscillator, the tuning fork is placed where the pressure is to be measured and caused to oscillate by means of an oscillator circuit. The pressure is determined by measuring the difference between the resonant resistance where the pressure is being measured and the natural resonance resistance of the tuning fork. One of the drawbacks of this device is that its range is limited at the low end when the resistance caused by the gas is of the same order as the natural resonance resistance of the tuning fork. The sensitivity is also limited at the high end by the shift from molecular resistance to the transition between molecular and viscous resistance.

In yet other gauges, a resonator is formed from a single crystal of silicon. In these devices a resonating element is maintained in a state of oscillation, the oscillation frequency providing a measure of a pressure or strain applied to the transducer.

The practical use of such tuning fork quartz sensors has hitherto been restricted or made impossible by numerous different problems. In the conventional method that uses a crystal resonator to measure pressures, such as a fork oscillator, the resonator usually has a temperature that is indefinitely varying during the measuring process. This is a major problem in connection with this measuring method is that the measured damping value is not only dependent on the pressure, but also on the temperature. This is negligible at high pressures (>1 mbar). However, the desired measurement can be greatly impaired by the temperature dependence at lower pressures, causing large errors when measuring the pressures in the lower pressure range. This disadvantageously makes accurate pressure measurement with the fork oscillator alone nearly impossible.

In order to reduce the interference effects, a number of possibilities have been proposed, such as using a special, tailor-made oscillating quartz in order to keep the temperature influences as low as possible. Use of a special quartz geometry has lead to an improvement in the measurement characteristics of the quartz, but does not satisfy practical requirements. The use of such special quartzes also leads to higher manufacturing costs.

It has also been proposed to use a resistor for temperature compensation or even thermostatically controlling the quartz. Compensation of the temperature influences by means of a NTC-resistor connected in series with the quartz oscillator is inadequate because there are only a few degrees of freedom of compensation and in particular higher order components remain uncompensated. Furthermore, thermostatic control leads to very high, unacceptable costs. Thus, the proposals made up to now only lead to a very limited error or fault compensation, while also being complicated and costly.

A major problem with conventional devices is that they do not have sufficient accuracy where a high degree of precision is required.

Another problem with conventional devices is that measuring a pendulum half-life in the molecular drag method is time consuming.

Another problem with conventional devices using the molecular drag method is their large size, high cost and limited range of measurement capability.

A problem with conventional resonant devices is that they are inaccurate because their resonant frequencies vary with oscillation amplitude.

A further problem with conventional devices is that they generally have a number of oscillating modes often of similar frequency and mixing of these modes effects the accuracy of the device.

Another problem with conventional devices is that temperature variations may cause large errors when measuring pressures, especially in the lower pressure range.

Another problem with conventional resonant devices is that compensation for temperature variations is incomplete.

Another problem with conventional resonant devices is that compensation for temperature variations using thermostatic controls is impractical and costly.

Another problem with conventional resonant devices is that compensation for temperature variations using a special crystal configuration is impractical and costly.

Another problem with conventional resonant devices is that compensation for temperature variations using a temperature compensating resistive circuit is inadequate, impractical and costly.

SUMMARY OF THE INVENTION

According to the present invention, there is provided a pressure responsive sensor device, preferably operating at its natural (i.e. "resonant") frequency. The pressure responsive mechanically resonant sensor device includes a rigid frame to which is affixed a torsion pendulum comprising a hollow tube and a resonant mass as well as optimal means for applying energy to drive the torsion pendulum at resonance. The interior of the hollow tube portion of the torsion pendulum communicates through a channel in the rigid frame with the fluid whose pressure is to be sensed. The device converts the mechanical input signal (fluid or gas pressure) to a variable output signal corresponding to a resonant frequency of the torsion pendulum, which varies proportionally to the input signal.

Accordingly, it is a general object of the present invention is to provide a gas pressure sensor that overcomes limitations and drawbacks of prior approaches to the measurement and indication of gas pressure conditions, particularly at lower pressures.

Another object of the present invention is to provide a pressure sensor having high sensitivity, accuracy, and long-term stability.

Another object of the present invention is to provide a pressure sensor which, on account of its construction and the shape, facilitates the measurement of a wide range of pressures.

Another object of the present invention to provide a pressure sensor that overcomes the aforementioned problems and disadvantages of existing quartz resonating pressure sensors known in the prior art.

Another object of the present invention is to provide a pressure sensor which, on account of its construction and the shape, facilitates the measurement of pressures, particularly in high-pressure, high-temperature applications, such as in oil well drilling.

A further object of this invention is to provide a pressure sensor that is relatively inexpensive and easy to manufacture.

Yet another object of the present invention is to keep undesired oscillations of the pressure sensor to the lowest level possible.

Another object of the present invention is to provide a pressure sensor that has a high range of measurement capability.

Another object of the present invention is to provide a pressure sensor that has high accuracy because its resonant frequencies do not vary with oscillation amplitude.

Another object of the present invention is to provide a pressure sensor in which temperature variations do not cause large errors when measuring pressures, especially in the lower pressure range.

Another object of the present invention is to provide a pressure sensor that only requires minimal compensation for temperature variations.

Another object of the present invention is to provide a pressure sensor which, on account of its construction and the shape, is particularly adapted to high-pressure, high-temperature applications, such as in oil well drilling.

Another object of the present invention is to provide a pressure sensor that does not require thermostatic controls.

Another object of the present invention is to provide a pressure sensor that does not require a special crystal configuration.

Another object of the present invention is to provide a pressure sensor that does not require using a temperature compensating resistive circuit.

The above, and other objects, features, and advantages of the present invention will become apparent from the following detailed description of illustrated embodiments thereof to be read in conjunction with the accompanying drawings, in which like reference numerals represent the same or similar parts.

DETAILED DESCRIPTION OF PREFERRED EMBODIMENTS

According to the present invention, there is provided a pressure responsive sensor device, preferably operating at its natural (i.e. "resonant") frequency. The pressure responsive mechanically resonant sensor device includes a rigid frame to which is affixed a hollow torsion pendulum as well as optimal means for applying energy to drive the torsion pendulum at resonance. The interior hollow portion of the torsion pendulum communicates through a port in the rigid frame with the fluid whose pressure is to be sensed. The device converts the mechanical input signal (gas or other fluid pressure) to a variable output signal corresponding to a resonant frequency of the torsion pendulum, which varies proportionally to the input signal.

Figure 1:
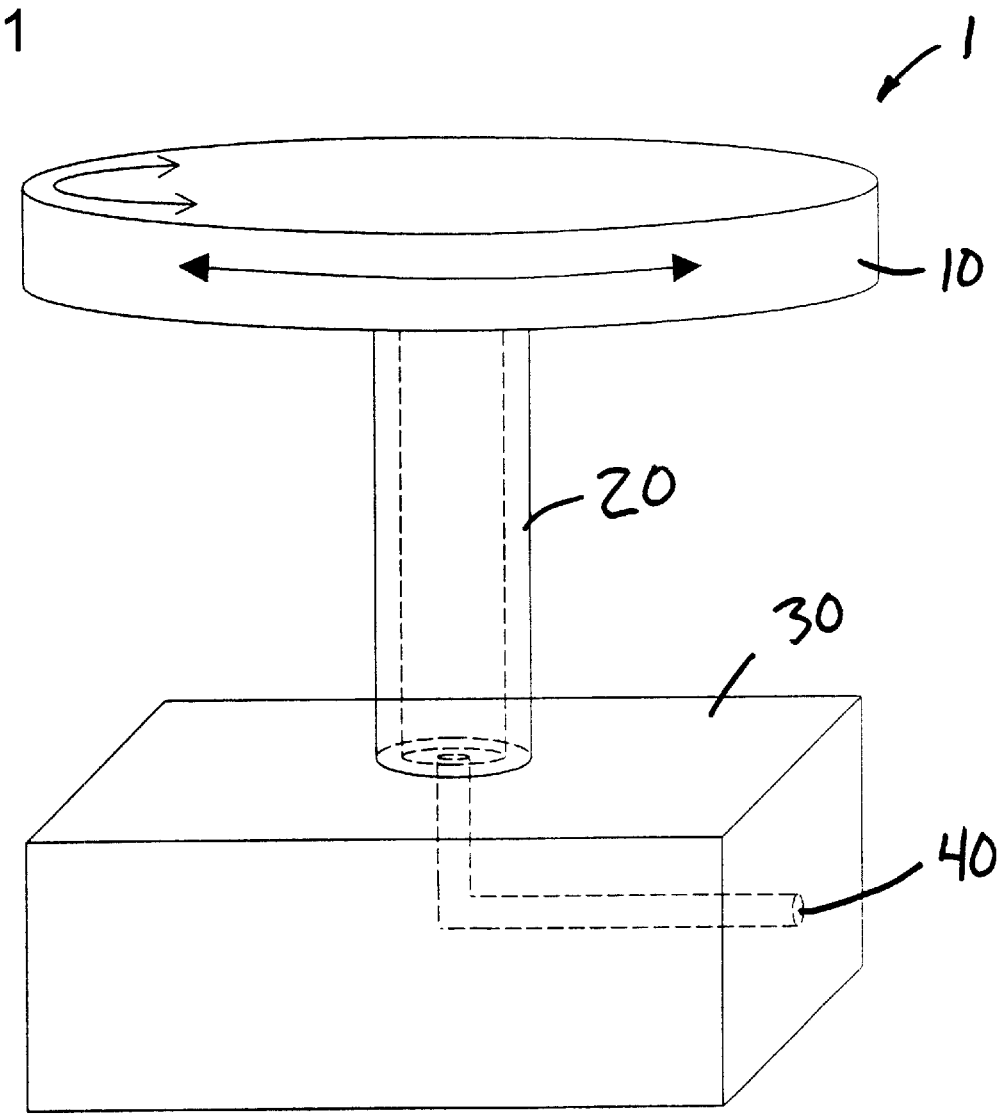
FIG. 1 is a perspective view of an embodiment of the resonant pressure sensor of the present invention using a disk shaped resonant mass.

Referring to FIG. 1: In accordance with principles of the present invention, a gas pressure sensor is provided for sensing a range of gas pressures within a gaseous environment. FIG. 1 shows the actual "sensing element" of the resonant pressure sensor, which comprises a resonant mass 10 attached to a hollow tube 20 which is further connected to a solid base 30. The interior of the hollow tube 20 communicates through a pressure port 40 in the base 30 with the environment whose pressure is to be sensed.

Figure 2:
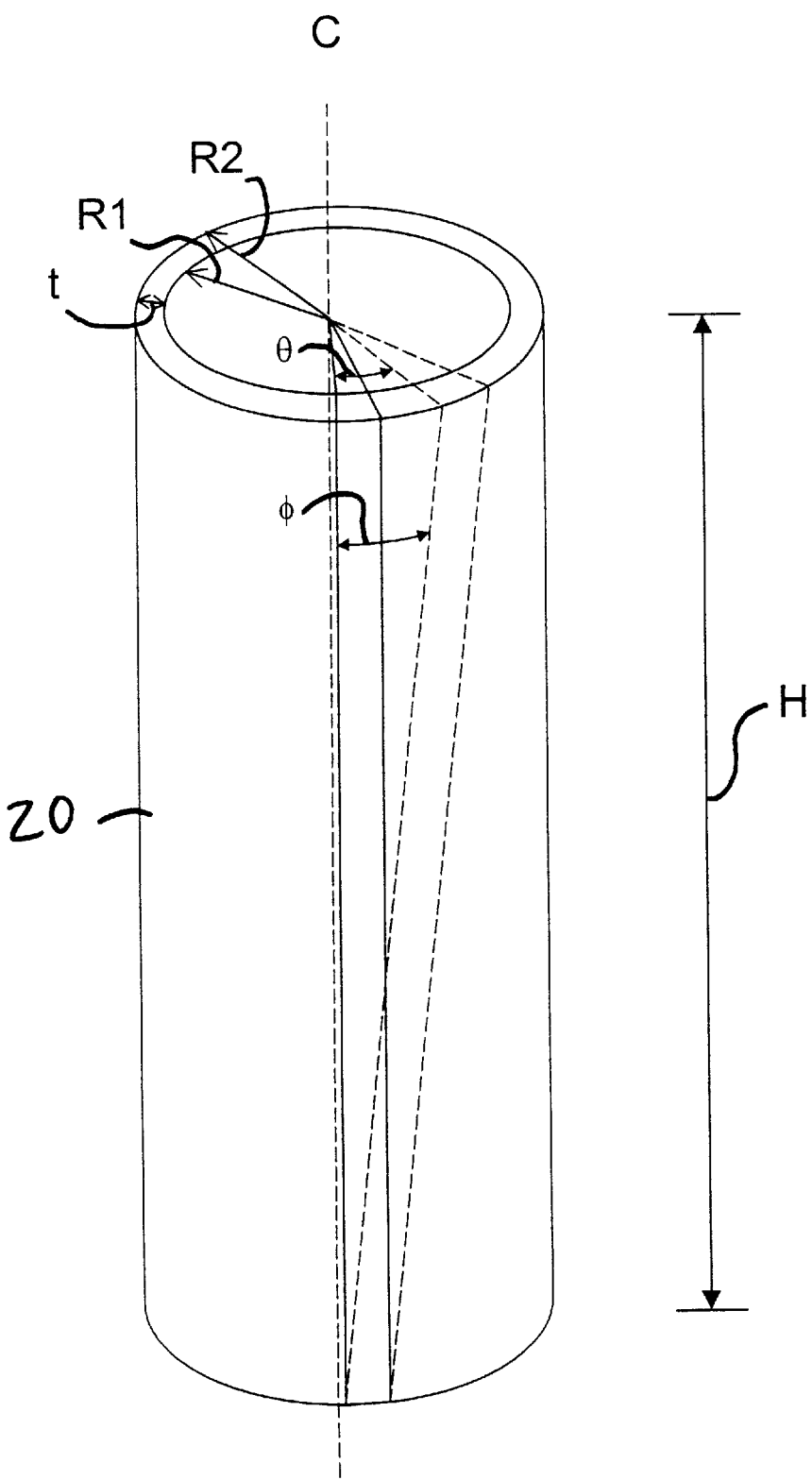
FIG. 2 is a perspective view illustrating the angular distortion of the hollow cylinder of the present invention at an extreme of its oscillation.

Referring to FIG. 2: The hollow tube 20 portion of the pressure sensor 1 preferably comprises a thin walled cylinder, having an interior radius $R_1$ and an exterior radius $R_2$ and a height H. Preferably, the thickness t of the wall of the hollow cylinder 20 is very thin, i.e., the difference between the inner radius $R_1$ and the outer radius $R_2$ is very small, on the order of ten percent of the outer radius $R_2$. The height H of the hollow tube is preferably larger than the outer radius $R_2$ of the hollow cylinder, and preferably at least three times the outer radius $R_2$, and most preferably ten times the outer radius $R_2$ of the hollow tube 20. This provides for a hollow tube 20 having an interior cavity having a cross-sectional area A1 and volume V and an exterior cross-sectional area A2 of:

$A1 = \pi R_1^2$ $V = H \pi R_1^2$ $A2 = \pi R_2^2$

The material of construction of the cylinder 20 preferably comprises a material which is deformable through an angle θ about a longitudinal axis C extending through the center of the hollow tube 20 parallel to its height H. The material of construction of the hollow tube 20 also has sufficient elasticity to create a restoring moment in response to the angular deformation θ of the cylinder 20 as well as a high mechanical quality factor $Q_M$ and high fatigue resistance. The material of construction of the hollow tube 20 preferably has a low coefficient of thermal expansion, or at least has a predictable reaction to temperature fluctuations. The material of construction of the hollow tube 20 is preferably a machinable, nonmagnetic material which has high corrosion resistance, as oxidation may affect the thickness t of the tube 20. Most preferably, the hollow tube 20 is constructed of titanium, but may also comprise plastic carbon fiber, steel, aluminum, alloys and other metals. Although in the preferred embodiment of the invention, the hollow tube 20 is cylindrical, the tube may also comprise other hollow forms such as tubes of oval, square, or hexagonal cross-section, or a variety of other hollow cross-sections.

Referring to FIG. 1: On one end of the hollow tube 20 is affixed a resonant mass 10. The resonant mass 10 comprises a solid material having a relatively greater mass than that of the tube 20. The resonant mass 10 also has a cross-sectional area A3 greater than the cross-sectional area A2 of the hollow tube 20. The resonant mass 10 preferably comprises a disk having a radius $R_3$ substantially greater than the outer radius $R_2$ of the hollow tube 20. Preferably the radius $R_3$ of the disk is at least twice the outer radius $R_2$ of the hollow tube 20, and most preferably at least four times the outer radius $R_2$ of the hollow tube 20.

The resonant mass 10 is connected at its center of mass, which is also preferably its geometric center, to the hollow tube 20 at its center, i.e., at the longitudinal axis C. At the connection point of the resonant mass 10 to the hollow tube 20, that end of the hollow tube 20 is sealed, i.e., it does not communicate with the external environment. The connection point of the resonant mass and the hollow cylinder 20 is a rigid bond such as by gluing or welding. Most preferably the resonant mass 10 and hollow tube 20 are machined from a single bar of titanium so that there is minimal risk of mechanical damping or fracturing due to differing material properties at the bond between the mass 10 and the tube 20.

Figure 3:
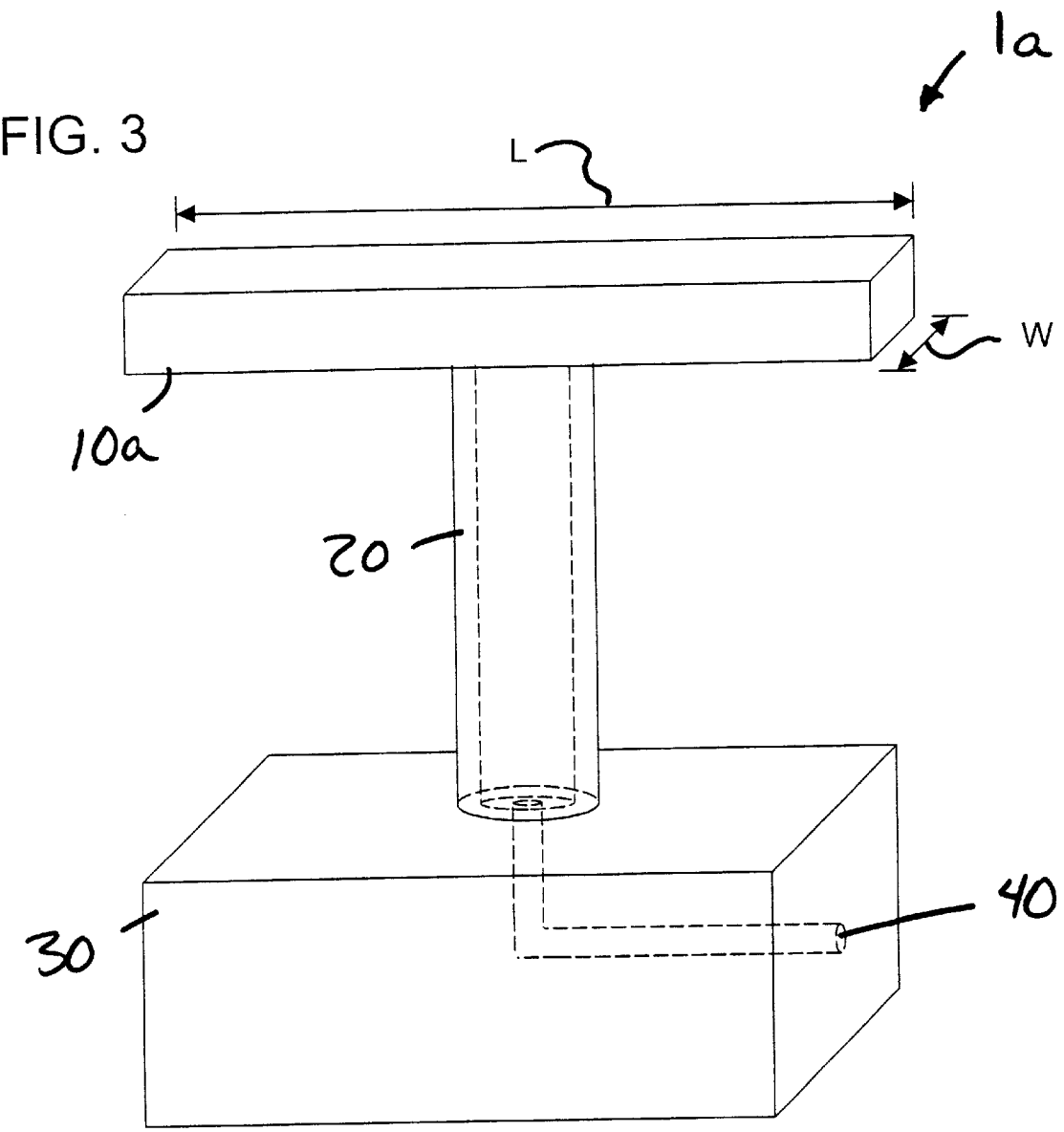
FIG. 3 is a perspective view of an alternate embodiment of the resonant pressure sensor of the present invention using a bar shaped resonant mass.

As illustrated in FIG. 3, an alternate pressure sensor 1a may include a resonant mass 10a that comprises a bar shaped mass 10a having a length L substantially greater than the outer radius $R_2$ of the hollow tube, and a width W at least as large as the twice the inner radius $R_1$ of the hollow tube 20. This also provides for the connection point of the resonant mass 10a to the hollow tube 20 to be sealed, i.e., it not in communication with the external environment. The resonant mass 10a is also connected at its center of mass, which is also preferably its geometric center, to the hollow tube 20 at its center, i.e., at the longitudinal axis C. Although in the preferred embodiment of the invention, the resonant mass 10 is disk shaped, it may also comprise other geometric forms such as those having an oval, square, or hexagonal cross-section, or a variety of other cross-sections. Preferably, the resonant mass 10 is constructed of metal and most preferably titanium, but may also comprise plastic, lead or steel or other solid masses.

The present invention also includes a solid base 30 to which is affixed the opposite end of the hollow tube 20. The base 30 preferably is motionless relative to the attached tube 20 and disk 10. To facilitate the immobility of the base 30 vrelative to the tube 20 and resonant mass 10, the base 30 preferably has a significantly greater mass than the tube 20 and resonant mass 10 combination. Alternatively, the base 30 may be rigidly attached to a massive device (not shown) such that it remains motionless relative to the tube 20 and mass 10. The base 30 is preferably constructed from similar materials to the tube 20 and mass 10, i.e., titanium, steel and the like.

The base 30 has a pressure port 40 extending through it. Specifically, a pressure port 40 extends through the surface of the base 30 at its connection point to the interior cavity the hollow tube 20. The pressure port 40 extends from the connection point of the base 30 to the hollow tube 20 to another surface of the base 30 which is in communication with the environment which is to have its pressure sensed. Thus, a pressure port 40 is provided through the base 30 which places the interior surface of the cavity of the hollow tube 20 in fluid (gaseous) communication with the environment which is to have its pressure measured. In the preferred embodiment of the invention, the interior cavity of the hollow tube is in direct communication with the external environment through the pressure port 40. It is within the scope of the present invention to provide an orifice or similar damping device within the pressure port 40 or between the hollow tube 20 and the base 30 in order to equalize pressure changes and/or filter spurious pressure and sound signals which may be transmitted through the fluid environment to the hollow tube 20. Furthermore, the exterior surface of the hollow tube 20 is isolated from the environment that is to have its pressure measured, i.e., at a constant pressure or vacuum, or even a variable pressure differing from the variable pressure in the pressure port. This may be facilitated by having the pressure port 40 in the base 30 extend through a wall (not shown) or by encasing the torsion pendulum within a chamber (not shown) having a constant pressure or vacuum therein. This provides for one pressure or vacuum to be applied to the exterior surface of the hollow tube 20, and a variable pressure on the interior surface of the hollow tube 20, such that there exists a pressure differential between the interior and exterior surfaces. Where there is a constant pressure or vacuum on the exterior surface of the tube 20, the pressure sensor 1 comprises an absolute pressure sensor 1. Where there is a variable pressure on the exterior surface of the tube 20, the pressure sensor 1 comprises a differential pressure sensor 1.

Figure 4:
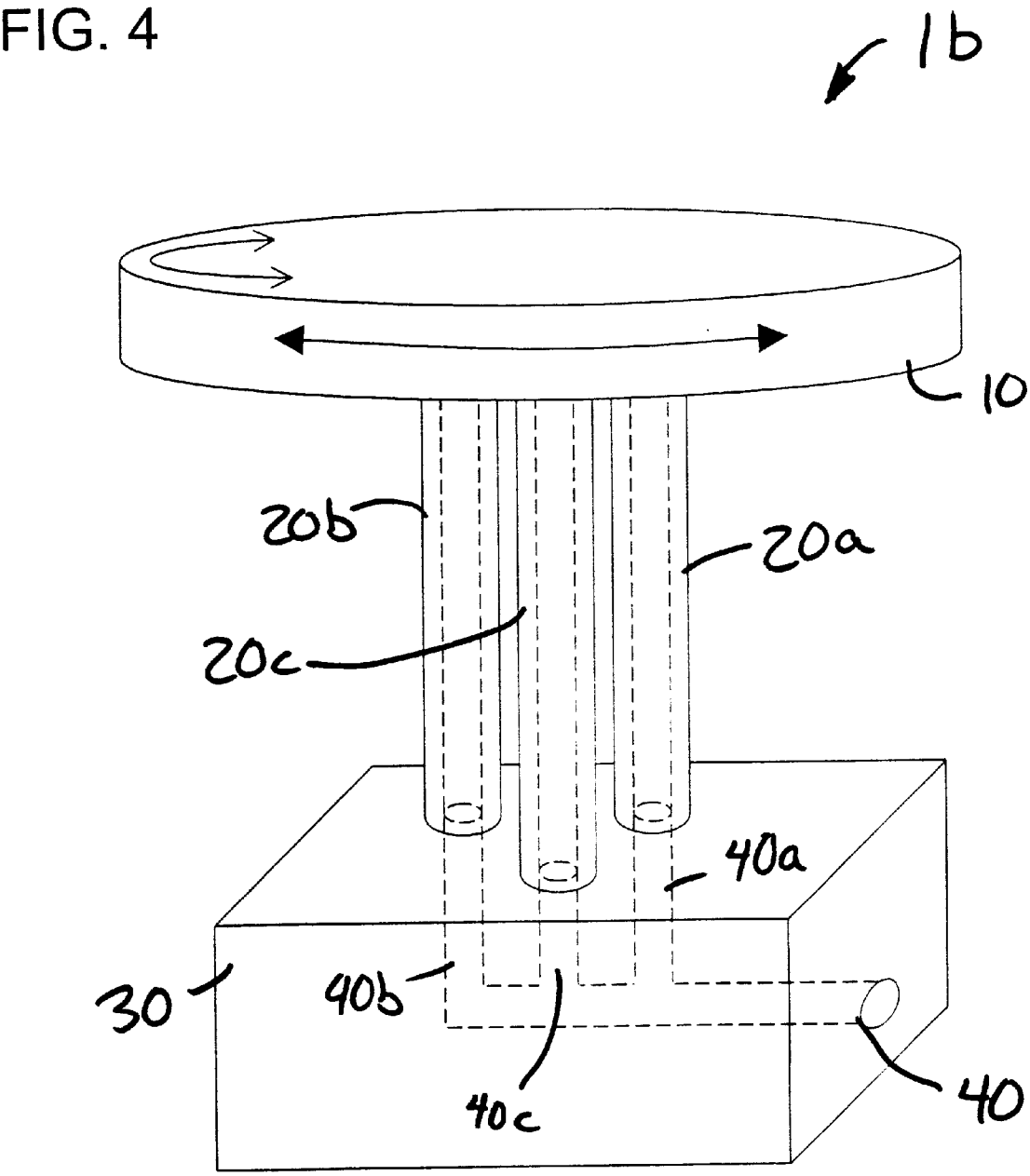
FIG. 4 is a perspective view of an alternate embodiment of the resonant pressure sensor of the present invention using multiple parallel tubes.
Figure 6:
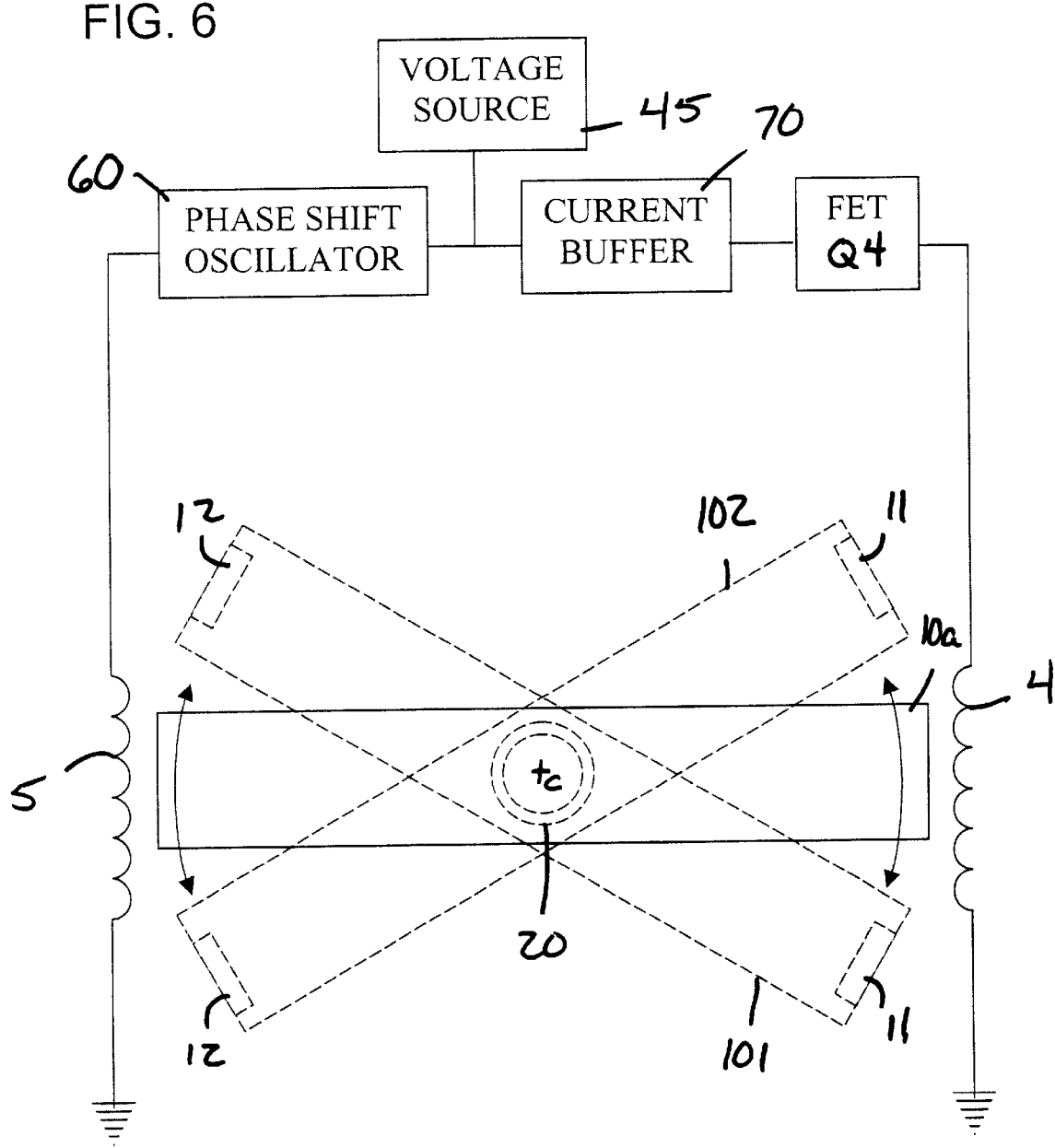
FIG. 6 is a top plan view of a range of oscillation of the bar-shaped resonant mass of FIG. 3 and a schematic of a driving mechanism.

Referring now to FIG. 4: In an alternate embodiment of the resonant pressure sensor 1b, a resonant mass 10 may be attached to multiple tubes 20a, 20b and 20c which are in parallel. More specifically the tubes 20a, 20b and 20c are each connected at one end to the resonant mass 10, such that each of their respective centers are equidistant from the center of mass of the resonant mass 10. This provides for the resonant mass 10 to be centered with respect to the combination of the three tubes 20a, 20b and 20c. The opposite ends of the tubes 20a, 20b and 20c are secured to a rigid mass. The hollow centers of each of the tubes 20a, 20b and 20c are each in communication with a pressure port 40a, 40b and 40c. These pressure ports 40a, 40b and 40c may join into a single port 40 as shown in FIG. 6, or they may extend through the rigid mass 30 each to a respective opening. It will be understood that an alternate pressure sensor 1b as above may have a resonant mass 10 attached to as few as two tubes in parallel, to as many as four or more tubes.

Figure 5:
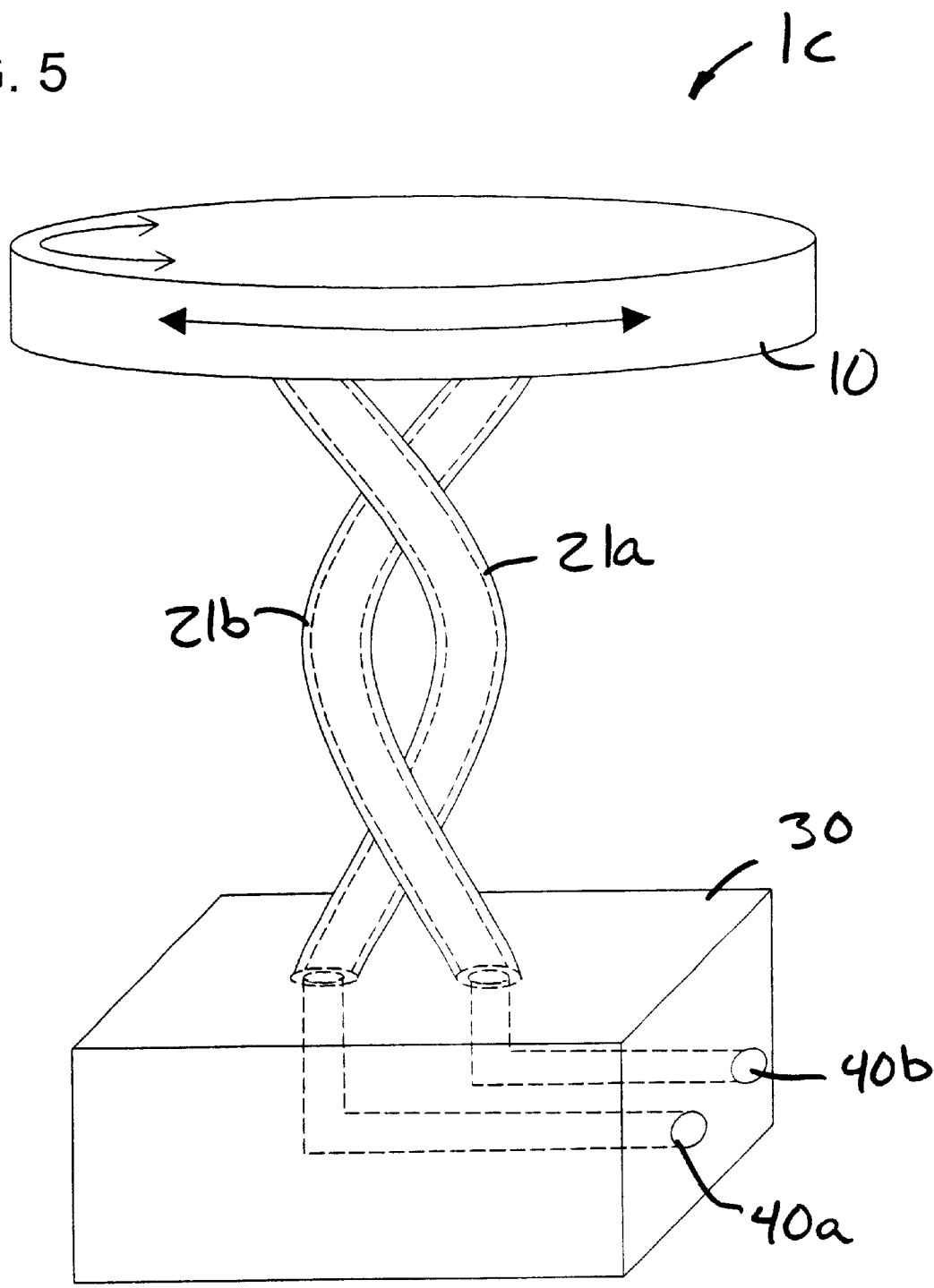
FIG. 5 is a perspective view of an alternate embodiment of the resonant pressure sensor of the present invention using multiple tubes which are curved and form a helix of parallel tubes.

Referring now to FIG. 5: Yet another alternative pressure sensor 1c may comprise a resonant mass 10 may attached to one end of each of one or more hollow tubes 21a and 21b which are not of a continuous cross-section, such as tubes which are curved or helical. Although these curved tubes 21a and 21b are not straight, i.e. continuously normal to the surface of the attached resonant mass 10, they are yet parallel with respect to each other, forming a double helix. The opposite ends of the hollow tubes 21a and 21b are each connected to a pressure port 40a and 40b respectively, each of which communicates with the environment exterior to the rigid base 30 through separate openings rather than a shared pressure port 40 as in FIG. 5.

It will be understood that each of these curved tubes 21a and 21b deforms much like a bourdon tube, and that the opposed parallel relationship and curved construction of the tubes 21a and 21b will provide rigidity to the structure. The use of multiple rigid curved tubes 21a and 21b can provide additional restoring torque to the tubes 21a and 21b when they are angularly rotated and deformed. It will also be understood that three or more curved tubes may be used to form a multiple helical structure attached to the resonant mass 10 and rigid base 30.

Regardless of the number or configuration of the tubes to which a resonant mass 10 and base 30 are attached, the composite structure 1b or 1c constructed as described behaves in a like manner to a pressure sensor 1 having a resonant mass 10 bonded to a single tube 20. Thus the performance of the pressure sensor 1 of FIG. 1 will be more fully described herein below, with such description applying equally to the alternative embodiments 1a, 1b and 1c of the pressure sensor.

The pressure sensor 1 of the present invention is functional in a broad range of sizes. For example, a pressure sensor 1 having the above stated relative dimensions and properties may comprise a hollow tube one foot long and one inch in outer diameter, with a resonant mass eight inches in diameter or larger. Alternatively, a modified embodiment of the pressure sensor may be constructed by micromachining and have dimensions on the order thousandths of an inch or even smaller. Preferably, a practical size for the pressure sensor 1 is on the order of one to several inches.

Referring now to FIG. 2: When the resonant mass 10 (not shown) is rotated through an angle θ, it rotates the rigidly attached hollow tube 20 through an angle θ. The angle θ through which the hollow tube 20 twists is proportional to the torque τ as long as the elastic limit of the hollow tube 20 is not exceeded. Thus the torque equals $$\tau = \kappa \theta$$

where κ is the torsion constant. The equal and opposite reaction torque equals $$\tau_{er} = -\kappa\theta = I\alpha = I d^2\theta/dt^2$$

which is the rotational equivalent of the linear equation $$F = -kx = ma = m d^2 x/dt^2$$

where I is the moment of inertia of the rotating object, $\alpha = d^2\theta/dt^2$ is the angular acceleration of the system, m is mass and $a = d^2 x/dt^2$ is acceleration.

Solving the differential equation for θ yields an equation for simple harmonic motion $$\theta = \theta_0 \sin \omega t$$

with $$\omega = (\kappa/I)^{1/2} = 2\pi f = 2\pi/T$$

where $\theta_0$ is the amplitude of the oscillation, ω is the angular frequency, and f and T are the frequency the period of oscillation respectively. Since we know that the period is:

$$T = 2\pi (I/\kappa)^{1/2}$$

If the moment of inertia of the system is known we can calculate the torsion constant κ of the tube 20 from a measurement of the frequency or period of rotational oscillation. Since the resonant disk 10 is essentially a solid cylinder, we know $$I = \tfrac{1}{2} M R_3^2$$

where M and $R_3$ are the mass and radius of the resonant disk 10. Therefore we can readily determine the torsion constant of the hollow tube 20. The torsion constant κ depends on the shape of the hollow tube 20 and on the material from which it is made according to:

$$\kappa = G\pi(R_2^4 - R_1^4)/2H$$

where $R_2$ and $R_1$ are the outer and inner radii of the hollow tube, and H is the height of the tube 20, and G is the torsion modulus, a known function of the material. Thus, the torsion modulus G, also known as the shear modulus or modulus of rigidity, for a hollow tube is related to the torsion constant κ by $$G=\kappa(2H/\pi(R_2^4-R_1^4)$$

Thus, the torsion constant κ is dependent on the material properties of the hollow tube 20 proportional to the torsion modulus G, but is also a function of the tube 20 dimensions. The dimensions of the hollow tube 20 are also a function of the other stresses on the tube, including pressure. Thus, the torsion constant κ will vary with pressure which affects the tube's dimensions and thereby its rigidity. The torsion constant κ of the thin walled tube 20 is related to the stresses caused by the internal pressure within the tube 20 where the stresses are $$\sigma_a = PR_2/2t$$
$$\sigma_h = PR_2/t$$

where $\sigma_a$ is the longitudinal or axial stress, $\sigma_h$ is the circumferential or hoop stress, P is the pressure, $R_2$ is the internal radius of the tube 20 and t is the thickness of the tube wall. The hoop stress in a thin-walled tube 20 is twice the axial stress in the tube 20. From this it follows that $$P=2\sigma_a t/R_1$$
$$P=\sigma_h t/R_1 \text{ or}$$
$$P=3t(\sigma_h+\sigma_a)/2R_1$$

As the tube 20 undergoes axial and hoop stress due to the change in pressure interior to the tube 20, it also undergoes axial and circumferential strain. The strain is the ratio between the change in length along a dimension and the same dimension when under no stress. In the elastic range, the stress is proportional to the strain according to Hooke's law, which states that:

$$\sigma=E\epsilon$$

where σ is the stress, ε is the strain, and E is the proportionality constant known as Young's modulus. Thus, under the axial and circumferential stresses, the tube 20 undergoes proportional axial and circumferential strains that cause a change, albeit miniscule, in the radius $R_1$ and height H of the tube 20. Since the torsion constant κ is also related to the radius of the thin walled tube, a small change in the tube radius also causes a small change in the torsion constant κ of the tube 20. Furthermore, since the torsion constant κ is proportional to the height of the tube 20, a small change in the height of the tube also creates a small change in the torsion constant κ of the tube 20.

In other words, the stresses in the tube are a function of the pressure within the tube and the tube radius. The stresses cause strains proportional to Young's modulus. Since the torsion constant κ is a function of the tube radius and height, it also varies with the total strain proportional to Young's modulus. Since the torsion constant κ varies, the period of oscillation of the torsion pendulum also varies. Thus, by measuring the changes in the period of oscillation of the torsion pendulum, one can determine the pressure within the hollow tube 20. To sum up the relationship between pressure and the torsion constant, the internal pressures are given by $$P=2\sigma_a t/R_1$$
$$P=\sigma_h t/R_1$$

Since the strains are proportional to the stresses $$\epsilon_h = PR_1/tE = \Delta R_1/R_1$$
$$\epsilon_a = PR_1/2tE = \Delta H/H$$

substituting the strains into the equation for the torsion constant κ, the expression $$\kappa = G\pi(R_2^4-R_1^4)2H$$

becomes $$\kappa = G\pi(R_2^4-(R_1+R_1\epsilon_h)^4)/2H(1+\epsilon_a)$$

and varies as a function of the pressure. This may alternately be viewed as a volume change in the height H and thickness t of the tube which vary according to the Bulk modulus. By changing the pressure within the tube 20, its properties, such as its diameter and density are predictably affected. An increase in pressure increases the torsion constant and overall rigidity of the tube 20. A decrease in pressure decreases the torsion constant and overall rigidity of the tube. Thus, by measuring the amplitude $$T=2\pi(I/\kappa)^{1/2}$$

of the oscillations and solving for the torsion constant, one can determine the pressure within the tube 20.

Thus, the atmosphere of the environment which is to have its pressure sensed travels through the pressure port 40 and into the hollow tube 20. Since the pressure on the inside of the tube 20 is varying and the external pressure on the tube 20 is different and preferably constant, the total stresses on the tube 20 vary with the pressure of the environment. The internal pressure in the tube 20 thereby changes the rigidity of the tube as defined by the torsion constant, and thereby changes the natural frequency of the torsion pendulum pressure sensor 1 comprising the oscillating resonant mass 10 fixed to the hollow tube 20.

The effect of the internal tube pressure on the torsion constant was tested using a brass tube with an outer diameter $R_2$ of 3/16 inch, a wall thickness t of 1/64 inch and a height of 11 inches. A constant torque was applied to one end of the tube at 0 psi and at 100 psi. The percentage change in deflection was measured as 0.11 percent for 100 psi change, or 0.0011 percent per psi pressure change. This is in close agreement with the computed percentage change in the torsion constant.

It will be understood that the torsion constant for alternate embodiments of the pressure sensor such as in FIGS. 3, 4 and 5 can be derived as above. For the sensor 1*a* of FIG. 3 well know equations for the inertia of the resonant mass 10*a* may be substituted for that of the disk 10 used in the above derivation. For the sensors 1*b* and 1*c* of FIGS. 4 and 5, the derivation of the relation between pressure and the torsion constant will include averaging of the sum of the affects of the plurality of tubes.

Figure 7:
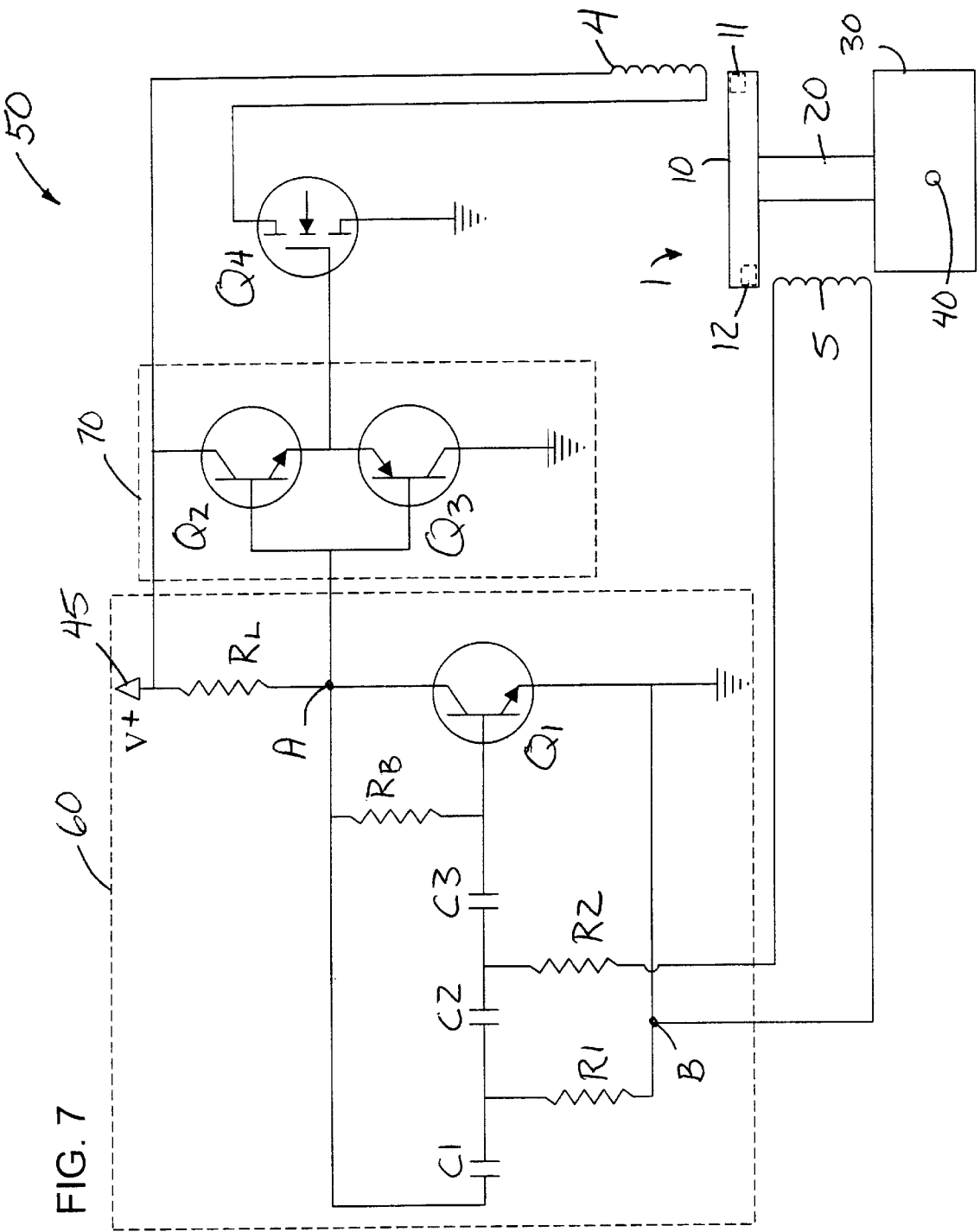
FIG. 7 is a schematic of an exemplary drive and feedback circuit for driving the resonant pressure sensor at its variable resonant frequency.

Referring now to FIGS. 6 and 7: The torsion pendulum pressure sensor 1 is adapted to oscillate at its resonant frequency (between positions 101 and 102) upon excitation by suitable driving means 50. In the preferred embodiment of the invention, this is accomplished through an electronic driver circuit 50 that electromagnetically drives the resonant mass 10. More specifically, the resonant mass has magnets 11 and 12 attached (on or within the resonant mass) on opposing ends of the bar 10*a* or on opposite ends of a diameter of the disk 10. Via an alternating current passing through an electrical coil 4, the disk 10 can be electromagnetically excited to oscillate at its resonant frequency. More specifically, an alternating current passing through a coil 4 which is in close proximity to the magnet 11, generates an alternating magnetic field which attracts or repulses the magnet 11, thereby applying a torque to the resonant mass 10 or 10*a*. A second coil 5 is placed in close proximity to the second magnet 12, and acts as a pickup coil 5 which generates an alternating electric field in response to the movement of the second magnet 12 in relation to the pickup coil 5. The pickup coil 5 is connected to a phase shift oscillator subcircuit 60. The phase shift oscillator subcircuit is connected to a FET 75 through a current buffer 70. A voltage source 45 is also provided and is connected between the phase shift oscillator 60 and the current buffer 70.

Referring to FIG. 7: FIG. 7 shows an exemplary circuit for driving the resonant mass electromagnetically. A driving coil 4 is located adjacent the resonant mass 10 in proximity to an imbedded magnet 11. Likewise, a pickup coil 5 is located adjacent the resonant mass 10 in proximity to another imbedded magnet 12. The driving coil 4 is connected to the driver portion of the circuit, and the pickup coil 5 is connected to the feedback portion of the circuit.

The feedback portion of the circuit comprises a phase shift oscillator 60. The phase shift oscillator 60 comprises a bipolar junction transistor (BJT) Q1, and several resistor-capacitor (RC) networks connected to a voltage source 45. More specifically, three capacitors C1, C2 and C3 are electrically connected in series. The series capacitors C1, C2 and C3 are connected in across the base and collector of the BJT Q1, i.e., opposite ends of capacitor C1 are connected to the collector of the BJT Q1 and capacitor C2, and opposite ends of capacitor C3 are connected to the base of the BJT Q1 and capacitor C2, and capacitor C2 is connected between capacitors C1 and C3. The emitter of the BJT Q1 is grounded. A first resistor R1 forms an RC network with the first capacitor C1 and is connected in parallel with capacitors C2 and C3 and the gate and emitter of the BJT Q1. In other words, one end of the first resistor R1 is connected between capacitors C1 and C2 and the other end of the first resistor R1 is connected to ground and the emitter of the BJT Q1. A second resistor R2 forms an RC network with the second capacitor C2 and is connected at one end between the second and third capacitors C2 and C3, and on its other end is connected to one side of the pickup coil 5. The remaining side of the pickup coil 5 is electrically connected to ground between the first resistor R1 and the emitter of the BJT Q1.

Bias resistor $R_B$ is connected in parallel with the base and collector of the BJT Q1 and in parallel with series capacitors C1, C2 and C3. In other words, bias resistor $R_B$ is connected on one end to the collector of the BJT Q1 and the first capacitor C1 and on the other end, to the base of the BJT Q1 and third capacitor C3. The bias resistor $R_B$ typically has a high value in order to bring the operation of the transistor Q1 into the linear range. The voltage source 45 is connected through a load resistor $R_L$ to the junction of the bias resistor $R_B$ with the collector of the BJT Q1 (junction A). Thus, the transistor Q1 is connected with two RC networks comprising R1-C1 and R2-C2, and a third RC network using the third capacitor C3 and a combination of the load resistor $R_L$ and the internal resistance of the transistor Q1.

The current buffer 70 is connected to the voltage source 45 and to the phase shift oscillator 60 at junction A. The current buffer 70 comprises a pair of stacked complimentary BJTs Q2 and Q3. More specifically, The first BJT Q2 is an NPN type BJT having its base connected to the base of the second BJT Q3, which is a PNP type BJT. The junction of the bases of the BJTs Q2 and Q3 is connected to the phase shift oscillator 60 at junction A. The emitters of the first and second BJTs Q2 and Q3 are connected to each other. Also, the collector of the second BJT Q3 is grounded, whereas the collector of the first BJT Q2 is connected to the voltage source 45.

The output side of the current buffer 70 is connected to the drive FET Q4, preferably an N-channel IGFET. More specifically, the gate of the FET Q4 is connected to the current buffer 70 and the junction of the two BJT's Q2 and Q3 emitters. The source of the FET Q4 is grounded, whereas the drain of the FET Q4 is connected to one end of the drive coil 4. The opposite end of the drive coil is connected to the voltage source 45 at the collector of the first BJT Q2 of the current buffer 70.

In operation, the drive circuit 50 generates an alternating electric field for initially exciting the oscillation of the torsion pendulum 1, and the phase shift oscillator 60 feedback subcircuit ensures the driver subcircuit drives the torsion pendulum 1 at resonance. The phase shift oscillator 60 operates initially at a resonant frequency determined predominantly by its circuit components BJT Q1, capacitors C1, C2 and C3 and resistors $R_B$, $R_L$ R1 and R2. For normal values of $R_B$, the biasing resistor has a much higher value than the other resistors, R1, R2 and $R_L$ of the phase shift oscillator 60 and has minimal effect upon the frequency of the phase shift oscillator. The initial resonant frequency equals:

$$F_0 = \frac{1}{2\pi(6R^2C^2 + 4RR_LC^2)^{1/2}}$$

Where $F_0$ is the initial resonant frequency, and C1=C2=C3 and R=R1=R2. This frequency is chosen to correspond to or nearly to the natural resonant frequency of the torsion pendulum 1.

Thus, the phase shift oscillator 60 provides the initial sinusoidal output with a frequency $F_0$ in a conventional manner. This sinusoidal signal is input into the current buffer 70, which serves a dual purpose. The current buffer isolates the load resistor $R_L$ from downstream components, and provides cleaner switching signals to the driver FET Q4. The sinusoidal signal from the phase shift oscillator 60 oscillating between ground and a positive voltage is applied to the bases of the BJTs Q2 and Q3. When the voltage is applied to the bases of the BJTs Q2 and Q3 of the current buffer 70 goes high, the base of BJT Q2 conducts. When the base of BJT Q2 is conducting, the voltage source 45 energizes the gate of the FET Q4. When signal applied to the bases of the BJTs Q2 and Q3 of the current buffer 70 goes low, the base of BJT Q3 conducts. When the base of BJT Q3 is conducting, the gate of the FET Q4 is connected to ground through the collector and the emitter of the BJT Q3 which quickly de-energizes the gate of the FET Q4.

When the gate of the FET Q4 is de-energized, there is no path for current to flow from the voltage source 45 through the driver coil 4. However, when the gate of the FET Q4 is energized current is allowed to flow through the driver coil 4 to ground through the FET Q4. As current alternatingly applied to and cut off from the driver coil 4, the magnetic field in the coil varies. More specifically, when the gate of the FET Q4 is energized, current flows through the coil 4 and FET Q4, storing energy in the inductor L11 and generating an increasing magnetic field. When the FET Q4 is de-energized, the magnetic field in the coil 4 collapses, generating a decreasing magnetic field. Thus as the FET Q4 turns on and off, the current is alternatingly applied to and cut off from the driver coil 4, which generates a sinusoidally varying the magnetic field in the coil 4. This magnetic field in the driver coil 4 alternatingly attracts and repulses the driver magnet 11 in the resonant mass 10. This results in a torque which drives the resonant mass 10 in alternating directions in a plane normal to the hollow tube 20, as illustrated in FIG. 6.

A feedback circuit is provided to ensure that the torque applied to the resonant mass 10 is at the resonant frequency of the torsion pendulum 1, which as stated herein above is related to the pressure within the hollow tube portion 20 of the torsion pendulum 1. This feedback control is accomplished by sensing the instantaneous frequency of the oscillation of the resonant mass 10 using the pickup coil 5. As the resonant mass 10 oscillates, the feedback magnet 12 moves in relation to the pickup coil 5. The motion of the magnet 12 in relation to the pickup coil (changing magnetic field or flux) induces an electric field in the coil 5 proportional to the magnitude of the magnetic flux.

One end of the pickup coil 5 is connected to ground and the other end is connected between capacitors C1 and C2 (at junction B) of the phase shift oscillator 60. The variable electric field in the pickup coil 5 adds or subtracts charge from the phase shift oscillator 60 at junction B, depending on the motion of the magnet 12 in the torsion pendulum 1. More specifically, when the resonant frequency of oscillation of the torsion pendulum increases, the magnet 12 moves faster, arriving adjacent (at the midpoint of the total deflection angle) to the pickup coil 5 more quickly. This generates an earlier (leading) instantaneous electric field in the pickup coil 5 thus introducing additional electric charge at junction B. Since there is a greater charge at junction B, transistor Q1 switches sooner, i.e., the frequency of the phase shift oscillator 60 increases due to a leading current. Conversely, when the resonant frequency of oscillation of the torsion pendulum 1 decreases, the magnet 12 moves more slowly, arriving adjacent (at the midpoint of the total deflection angle) to the pickup coil 5 more slowly. This generates a later (lagging) instantaneous electric field in the pickup coil 5 thus subtracting electric charge at junction B. Since there is less charge at junction B, transistor Q1 switches later, i.e., the frequency of the phase shift oscillator 60 decreases due to a lagging current. The frequency of the driver FET Q4 matches the change of frequency in the phase shift oscillator 60, and thus the torsion pendulum 1 is driven at the new frequency. Thus, the phase shift oscillator 60 and pickup coil 5 are designed to automatically match the driving frequency to the resonant frequency of the torsion pendulum 1.

Thus, it can be seen that when the pressure inside the hollow tube 20 increases, the tube 20 becomes stiffer (increased torsion constant) and the resonant frequency of the torsion pendulum 1 increases. Also, when the pressure inside the hollow tube 20 decreases, the tube 20 becomes less stiff (decreased torsion constant) and the resonant frequency of the torsion pendulum 1 decreases. As the resonant frequency of the torsion pendulum increases or decreases, the feedback portion of the driver 50 is designed to match the driving frequency to the resonant frequency of the torsion pendulum 1.

The feedback circuit is connected to an indicator circuit which provides an indication of the frequency of oscillation of the resonant mass, which provides an indication of the pressure within the gaseous environment, i.e., within the hollow tube 20. The means for indicating the oscillation frequency may comprise an additional pickup coil (not shown) for sensing the cyclic magnetic flux indicative of the frequency, or electrostatic means (not shown) in vicinity of the pickup coil 5 for sensing the oscillating electric field. Thus, the indicator circuit is connected to the feedback circuit for converting the electrical signal indicative of the frequency/period of the torsion pendulum into an indication of the pressure sensed within the gaseous environment. The indicator circuit may also contain logic components, such as a microcomputer for making the conversion according to the above equations from the sensors period T to the pressure within the hollow tube 20.

The driving means 50 described were essentially magnetic, but other means for resonant driving and feedback are possible and desirable. For example, driver means 50 for the resonant disk 10 may comprise a pair of capacitor plates in lieu of the driver the magnet 11 and driver coil 4, and another pair of capacitor plates in lieu of magnet 12 and pickup coil 5. Applying an alternating electric field to the driver plate can be used to drive the resonant mass 100 electrostatically instead of magnetically, and capacitively sensing the electrostatic charge at the pickup plate can be used to provide feedback to the phase shift oscillator circuit 60.

This electrostatic driver means is particularly suitable and desirable when fabricating a very small pressure sensor 1 by MEMs. For a MEMs pressure sensor 1 the electrostatic (capacitor) plates are small in size, and at that scale provide sufficient torque to drive the resonant mass 10. The driver means 50 may alternatively, or in combination include driver and/or feedback means using laser and fiber optic connections to apply laser light pressure as an optical driver and provide optical signal feedback for example to a charge-injection device (CID) array. The optical drive system would also be suitable to MEMs fabricated pressure sensors 1.

Another alternative driver means 50 includes pneumatic means. The frequency output may be controlled using a pneumatic amplifier in combination with a bellows system and pneumatic feedback loop for driving the resonant mass 10. This design is particularly desirable in high temperature or high radiation applications which are deleterious to electronic circuit components.

In other resonant pressure sensors the tube walls resonate radially (parallel to the pressure effect of the fluid). Because this mode of vibration is radial, the density of the medium affects the resonant frequency of the pressure sensor, which affects the sensed pressure. In the present invention, the resonant motion of the tube 20 walls is always at right angles to the pressure effect of fluid within the sensor 1 and thus has a high degree of accuracy independent of the type of fluid. Thus, since the motion of the tube 20 is at right angles to the fluid it does not effect the fluid density, which in other sensors introduces errors in pressure measurement. Also because the present invention is so robust it can withstand high pressure-high temperature applications (such as in oil well drilling) and provide accurate pressure measurements.

While the above description contains many specificities, these should not be construed as limitations on the scope of the invention, but rather as an exemplification of one preferred embodiment thereof. Many other variations are possible, for example:

The pressure sensor may sense gas pressure or the pressure of a variety of other fluids;

The pressure sensor may be an absolute pressure sensor or a relative pressure sensor;

The resonant mass may be cylindrical, rectahedral, tetrahedral, prism-shaped, oval, or a variety of other shapes;

The hollow tube portion may contain a single tube or multiple tubes;

The hollow tube portion may contain a straight or curved tube or multiple tubes;

The driving means may be magnetic, electrostatic, pneumatic, optical or combinations thereof.

Accordingly, the scope of the invention should be determined not by the embodiment illustrated, but by the appended claims and their legal equivalents.

I claim:

1. A resonant pressure sensor, comprising:
   a rigid base member having first and second surfaces;
      said first surface being in communication with a first fluid environment having a variable pressure;
      said rigid base member having a pressure port extending therethrough from said first surface to said second surface of said rigid base member;
   a hollow tube member having first and second ends, an inner surface, an outer surface, a wall thickness between said inner and outer surfaces, and an internal cavity bounded by said inner surface and said first and second ends;
      said first end of said hollow tube member being rigidly attached to said second surface of said rigid base member;
      said internal cavity being in fluid communication with said first fluid environment through said pressure port;
   a resonant mass rigidly attached to said second end of said hollow tube member;
      said resonant mass and said attached hollow tube member having a resonant frequency dependent upon a pressure of said first fluid environment on said inner surface of said hollow tube member; and
   electromagnetic driving means for electromagnetically applying a torque to said resonant mass, said electromagnetic driving means being adapted to apply said torque at said resonant frequency of said resonant mass and said attached hollow tube member;
      said electromagnetic driving means comprising an electromagnetic driving signal receptor attached to said resonant mass and an electromagnetic driving signal generator located adjacent said resonant mass and said electromagnetic driving signal receptor.

2. The resonant pressure sensor according to claim 1, wherein said outer surface of said hollow tube member is in fluid communication with a second fluid environment having a second pressure.

3. The resonant pressure sensor of claim 2, wherein said second pressure is a constant pressure.

4. The resonant pressure sensor of claim 2, wherein said second pressure is a variable pressure.

5. The resonant pressure sensor of claim 4, wherein said hollow tube member is a cylindrical tube having a central axis, said wall thickness being between an inner radius and an outer radius concentric about said central axis;
   and wherein said hollow tube member is adapted to twist radially through a deflection angle about said central axis in response to said applied torque.

6. The resonant pressure sensor of claim 5, wherein said resonant mass has a center of mass, said resonant mass having said center of mass located along said central axis of said hollow tube member.

7. The resonant pressure sensor of claim 6, wherein said resonant mass comprises a rectahadral bar having a length and a width;
   said resonant mass being attached to said hollow tube member with a midpoint of said length and a midpoint of said width each located along said central axis of said hollow tube member.

8. The resonant pressure sensor of claim 6, wherein said resonant mass comprises a disk-shaped cylinder having a disk diameter having a disk center at a midpoint of said diameter;
   said resonant mass being attached to said hollow tube with said disk center located along said central axis of said hollow tube member.

9. The resonant pressure sensor of claim 8, wherein said electromagnetic driving means further comprises:
   an electromagnetic feedback signal generator;
      said electromagnetic feedback signal generator being located at a second end of said diameter of said resonant mass; and
   an electromagnetic feedback signal receptor;
      said electromagnetic feedback signal receptor being adjacent said resonant mass and said electromagnetic feedback signal generator;
   and wherein said electromagnetic driving signal receptor is located at a first end of said diameter of said resonant mass.

10. The resonant pressure sensor of claim 9, wherein said electromagnetic driving signal generator and receptor are selected from the group comprising magnetostatic, electrostatic, and electro-optical;
    and wherein said electromagnetic feedback signal generator and receptor are selected from the group comprising magnetostatic, electrostatic, and electro-optical.

11. The resonant pressure sensor of claim 9, wherein said electromagnetic driving signal receptor comprises a first magnet attached to said resonant mass;
    and wherein said electromagnetic driving means further comprises:
    a voltage source;
    a phase shift oscillator subcircuit having an input side and an output side;
       said input side of said phase shift oscillator subcircuit being electrically connected to said electromagnetic feedback signal receptor;
    a driving transistor having a gate a drain and a source;
       said gate of said driving transistor being electrically connected to said output side of said phase shift oscillator;
    a driving coil having first and second ends;
       said first end of said driving coil being electrically connected to said voltage source;
       said second end of said driving coil being electrically connected to said drain of said driving transistor;
       said driving coil being located adjacent a midpoint of the motion of said first magnet through said deflection angle.

12. The resonant pressure sensor of claim 9, wherein said electromagnetic driving signal receptor comprises a first metal plate attached to said resonant mass;
    and wherein said electromagnetic driving signal receptor means further comprises:
    a voltage source;
    a phase shift oscillator subcircuit having an input side and an output side;
       said input side of said phase shift oscillator subcircuit being electrically connected to said electromagnetic feedback signal receptor;
    a driving transistor having a gate a drain and a source;
       said gate of said driving transistor being electrically connected to said output side of said phase shift oscillator; and
    a metal driving plate having first and second terminals;
       said first terminal of said driving plate being electrically connected to said voltage source;

said second terminal of said driving plate being electrically connected to said drain of said driving transistor;

said driving plate being located adjacent a midpoint of the motion of said first metal plate through said deflection angle.

13. The resonant pressure sensor of claim 11, wherein said electromagnetic feedback signal generator comprises a second magnet attached to said resonant mass;

and wherein said electromagnetic feedback signal receptor further comprises:

a feedback coil with first and second ends;

said first end of said feedback coil being electrically connected to ground;

said second end of said feedback coil being electrically connected to said input side of said phase shift oscillator subcircuit;

said feedback coil being located adjacent a midpoint of the motion of said second magnet through said deflection angle.

14. The resonant pressure sensor of claim 11, wherein said electromagnetic feedback signal generator comprises a second metal plate attached to said resonant mass;

and wherein said driving means further comprises a metal feedback plate with first and second terminals;

said first terminal of said feedback plate being electrically connected to ground;

said second terminal of said feedback plate being electrically connected to said input side of said phase shift oscillator subcircuit;

said feedback plate being located adjacent a midpoint of the motion of said second metal plate through said deflection angle.

15. The resonant pressure sensor of claim 13, wherein said electromagnetic driver means further comprises:

a current buffer having an input and an output side;

said input side of said current buffer being connected to said output side of said phase shift oscillator;

said output side of said current buffer being connected to said gate of said driving transistor.

16. The resonant pressure sensor of claim 15, wherein said phase shift oscillator subcircuit comprises:

a first transistor having a base, a collector and an emitter;

a first capacitor, a second capacitor, and a third capacitor connected in series;

said series connected capacitors being connected across said gate and said collector of said first transistor;

a bias resistor connected across said gate and said collector of said first transistor;

a first resistor having a first end connected to said second and third capacitors, and having a second end connected to said second end of said feedback coil;

a second resistor having a first end connected to said second and first capacitors, and having a second end connected to said first end of said feedback coil, to said collector of said first transistor and to ground; and a load resistor connected between said voltage source and said collector of said first transistor.

17. The resonant pressure sensor of claim 16, wherein said current buffer comprises:

a second transistor having a base, a collector and an emitter; and a third transistor having a base, a collector and an emitter;

said emitters of said second and third transistors being electrically connected to each other and to said gate of said driving transistor;

said bases of said second and third transistors being electrically connected to each other and to said collector of said first transistor;

said collector of said second transistor being electrically connected to said voltage source and said first end of said driving coil; and said collector of said third transistor being electrically connected to ground.

18. A resonant pressure sensor, comprising:

a rigid base member having first and second surfaces;

said first surface being in communication with a first fluid environment having a variable pressure;

said rigid base member having a plurality of pressure ports extending therethrough from said first surface to said second surface of said rigid base member;

a plurality of hollow tube members each having first and second ends, an inner surface, an outer surface, a wall thickness between said inner and outer surfaces, and an internal cavity bounded by said inner surface and said first and second ends;

each of said first ends of said hollow tube members being rigidly attached to said second surface of said rigid base member;

each of said internal cavities being in fluid communication with said first fluid environment through one of said pressure ports;

a resonant mass rigidly attached to each of said second ends of said hollow tube members; and driving means for applying a torque to said resonant mass, said driving means being adapted to apply said torque at a resonant frequency of said torsion pendulum;

said resonant frequency being dependent upon a pressure of said first fluid environment on said inner surfaces of said hollow tube members; and electromagnetic driving means for electromagnetically applying a torque to said resonant mass, said electromagnetic driving means being adapted to apply said torque at said resonant frequency of said resonant mass and said attached hollow tube member;

said electromagnetic driving means comprising an electromagnetic signal receptor attached to said resonant mass and an electromagnetic signal generator located adjacent said resonant mass and said electromagnetic signal receptor.

19. The resonant pressure sensor of claim 18, wherein said electromagnetic driving signal generator and receptor are selected from the group comprising magnetostatic, electrostatic, and electro-optical;

and wherein said electromagnetic feedback signal generator and receptor are selected from the group comprising magnetostatic, electrostatic, and electro-optical.

* * * * *